Dec. 15, 1931.    L. W. THOMPSON    1,836,886
ELECTRICAL REGULATOR AND REGULATING SYSTEM
Filed April 29, 1930

Inventor:
Louis W. Thompson,
by Charles E. Tullar
His Attorney.

Patented Dec. 15, 1931

1,836,886

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

ELECTRICAL REGULATOR AND REGULATING SYSTEM

Application filed April 29, 1930. Serial No. 448,395.

My invention relates to electrical regulators and regulating systems, and more particularly to systems for regulating the voltage of alternating current feeder circuits.

It is often desirable to provide means for compensating for the variation in voltage drop in electric circuits supplying energy to variable high power factor loads so as to maintain substantially constant voltage at the load end of such circuits. The majority of such means, such as feeder voltage regulators, have in the past been relatively expensive pieces of apparatus and have contained moving parts thus requiring a certain amount of periodical attention. In accordance with the illustrated embodiments of my invention I produce a variable compensatory voltage boost by drawing a regulable lagging current through a capacitance.

An object of my invention is to provide a simple alternating current circuit regulator and regulating system having no moving parts. Another object of my invention is to provide a simple alternating current feeder voltage regulator and regulating system having no moving parts.

My invention will be better understood from the following description taken in connection with the accompanying drawings and its scope will be pointed out in the appended claims.

Figure 1:
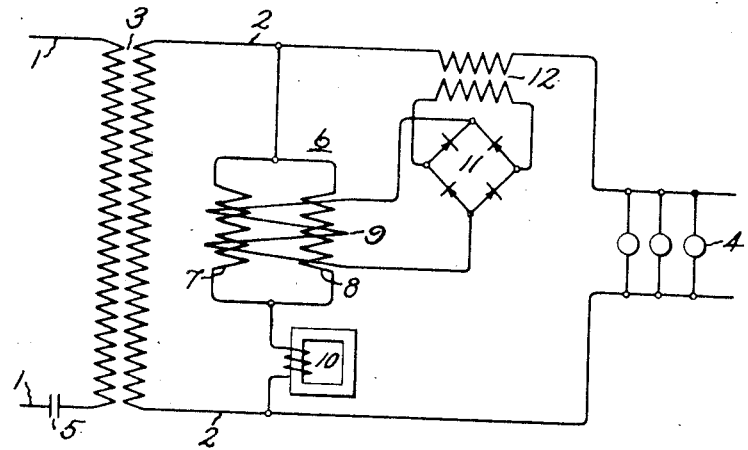
Figure 2:
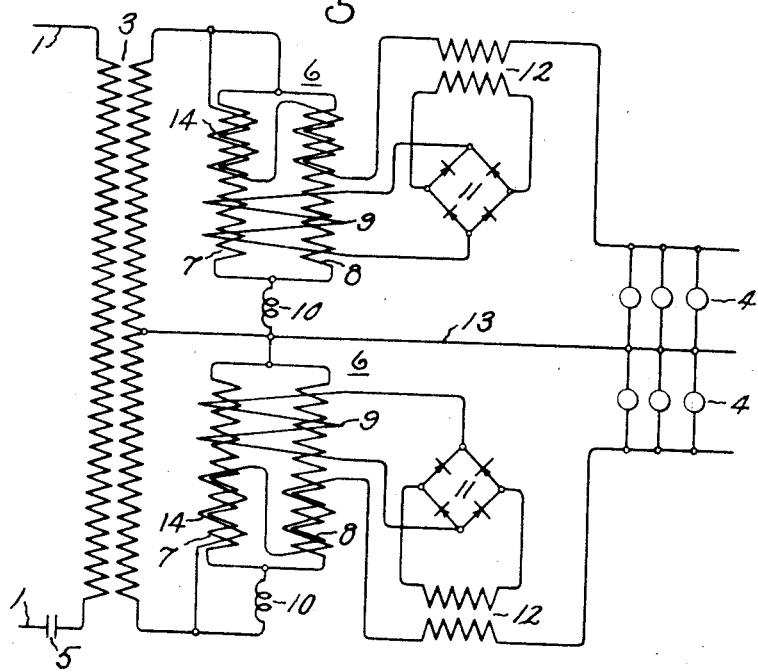

In the drawings Fig. 1 is a diagrammatic showing of a preferred embodiment of my invention as applied to a simple two-wire alternating current distribution system, while Fig. 2 is a diagrammatic showing of a modified embodiment of my invention as applied to a three-wire alternating current distribution system.

In Fig. 1, 1 may be taken to represent an alternating current power supply circuit which is connected to a secondary distribution or feeder circuit 2 through a stepdown distribution transformer 3. Transformer 3 is shown and described because it is an indispensable part of the conventional alternating current distribution system. However, it is not essential to my invention and consequently circuits 1 and 2 may be considered as a single circuit if desired without departing from my invention in its broader aspects. Feeder circuit 2 has connected thereto a plurality of high power factor load devices 4 which may be of any type, such as incandescent lamps, toasters, etc. A condenser 5, through which a regulable lagging current is to be drawn, may be connected in either circuit 1 or in circuit 2, and as shown, it is connected in circuit 1, preferably adjacent the primary winding of transformer 3. For varying the lagging current drawn through condenser 5 and hence varying the voltage of circuit 2 I provide a saturable reactor 6 connected in parallel to the load 4. This reactor, which is diagrammatically shown, may be of any suitable type, but I prefer to employ two alternating current coils 7 and 8 so arranged that together they do not induce a voltage in a direct current saturating winding 9. In order to reduce the effect of harmonics which might be produced as a result of the saturation of reactor 6, I employ a reactor 10 connected in series therewith, this reactor being so designed as to offer a low impedance to the current at the fundamental frequency but a high impedance to harmonics. In order to provide a direct current for coil 9 which varies in accordance with variations in the magnitude of load 4, I prefer to connect this coil in circuit 2 through a rectifying device 11 and a current transformer 12. Rectifying device 11 may be of any suitable type and in the specific embodiment illustrated it comprises a full wave rectifier of the dry disc copper oxide type.

In describing the operation of the embodiment of the invention shown in Fig. 1, it will be assumed that power supply circuit 1 is connected to be energized from any suitable source of alternating current (not shown) and that the load on circuit 2 has just been increased. Under these conditions the increased current flow through circuit 2 as a result of the increase in load will cause an increase in direct current to flow in saturating winding 9 with the result that the inductive reactance of reactor 6 decreases and an increase in current flow therefore takes place through it. The increase in current flow through reactor 6 will of course be at a low power factor and will be lagging with respect to the voltage of circuit 2. Consequently this increase in lagging current through condenser 5 will result in a voltage rise in circuit 1, for as the voltage drop in a capacitance leads the current producing it by ninety degrees and as in this case this current lags the voltage of the circuit, the voltage drop in the condenser will have a component which is in phase with and in the same direction as the voltage of the circuit. Thus, if the capacitance of condenser 5 is made greater than the inductance of line 1, or, in other words, if line 1 as a whole including condenser 5, is made capacitive an increase in lagging current therethrough will result in a reactance drop therethrough which is actually a rise in voltage and which when vectorially combined with the resistance drop through line 1 may be of such value as to greatly minimize the variations in voltage across the terminals of load 4 with variations in the magnitude thereof. Likewise a decrease in load on circuit 2 results in an increase in the ohmic impedance of reactor 6 thereby reducing the magnitude of the lagging quadrature component of the current passing through condenser 5, thereby reducing the voltage rise through condenser 5.

Although I have shown and described a particular way of varying the saturation of reactor 6 with variations in load on circuit 2 through means responsive to the current in this circuit, it should be borne in mind that an object of my invention is to provide means for regulating the voltage at the terminals of load 4 and hence any means which would vary the saturating current in winding 9 directly in response to variations in voltage across circuit 2 might equally well be used. One such means is shown and described in my prior Patent 1,654,948, granted January 3, 1928, which is assigned to the same assignee as this application.

In the modification shown in Fig. 2 the secondary distribution circuit is shown as a three-wire circuit having a neutral wire 13, duplicate reactors 6 and 10 being connected between the conductors of this circuit and the neutral, while duplicate rectifiers 11 and current transformers 12 vary the saturation of their respective reactors 6 with variations in the magnitude of the loads on their respective sides of the circuit. Reactors 6 are, however, provided with additional windings 14 which are connected in the outer conductors of the three-wire system. The purpose of these windings is to produce a voltage buck so as to compensate for the no load rise in voltage which is produced by the lagging exciting current of the unsaturated reactors flowing through the condenser 5. As the load increases and the saturation of reactors 6 likewise increases the bucking voltage induced in winding 14 becomes negligible.

While I have shown and described particular embodiments of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:—

1. In combination, an alternating current circuit, a variable load connected to said circuit, a static reactance connected in parallel with said load, a second static reactance connected in series with said load and said first mentioned reactance, the voltage drops in said reactances being vectorially opposite in direction with respect to their respective currents, and means for varying the magnitude of one of said reactances with variations in an electrical condition of said circuit.

2. In combination, an alternating current circuit, high power factor load devices connected to said circuit, a static reactance connected in said circuit, a second static reactance connected in parallel with said load devices, one of said reactances being capacitive the other being reactive, and static means for varying the ohmic value of one of said reactances with variations in load on said circuit.

3. In combination, an alternating current circuit, load devices connected to said circuit, an inductive reactance connected across said circuit, a capacitive reactance in series relation with said load devices and said inductive reactance, and means for varying the magnitude of said inductive reactance in accordance with variations in the load on said circuit.

4. In combination, an alternating current circuit, load devices connected to said circuit, an inductive reactance connected in parallel with said load devices, a capacitive reactance connected in series with said load devices and said inductive reactance, and means for varying the magnitude of said inductive reactance in accordance with variations in the current through said load devices.

5. In combination, an alternating current circuit, a variable load connected to said circuit, a saturable inductive reactance connected in parallel with said load, a capacitive reactance connected in series with said load and said saturable inductive reactance, and means for varying the saturation of said saturable reactance in proportion to variations in the current through said load.

6. In combination, an alternating current circuit, a variable load connected to said circuit, a saturable inductive reactance connected in parallel with said load, means connected in series with said load and inductively coupled with said reactance for producing a bucking voltage with respect to the voltage of said circuit, a capacitive reactance connected in series with said load and said inductive reactance, and means for varying the saturation of said inductive reactance in proportion to variations in current through said load.

7. In combination, an alternating current circuit, a variable load connected to said circuit, a saturable reactor connected in parallel with said load, a reactor having a low impedance to the fundamental frequency of said circuit but a high impedance to harmonics thereof connected in series with said saturable reactor, a condenser connected in series with said load and saturable reactor, and means including a rectifier for varying the saturation of said saturable reactor in proportion to variations in load current.

8. In an electrical distribution system, in combination, an alternating current power supply circuit, a secondary distribution circuit, a distribution transformer connecting said circuits, a condenser connected in said power supply circuit, a variable load connected to said distribution circuit, a saturable reactor connected in parallel with said load, and means including a full wave rectifier for varying the saturation of said reactor in accordance with variations in load current.

9. In an electrical distribution system, in combination, an alternating current power supply circuit, a distribution transformer having its primary winding connected thereto, a three-wire secondary distribution circuit connected to the secondary winding of said transformer, a condenser connected to said primary winding, variable loads connected to each side of said three-wire circuit, a separate saturable reactor connected in parallel with each load, means including a rectifier for varying the saturation of each reactor in accordance with variation in its respective load, and a separate winding in series with each load which is inductively related to the associated reactor.

In witness whereas, I have hereunto set my hand this 24th day of April, 1930.

LOUIS W. THOMPSON.